Figure 3:
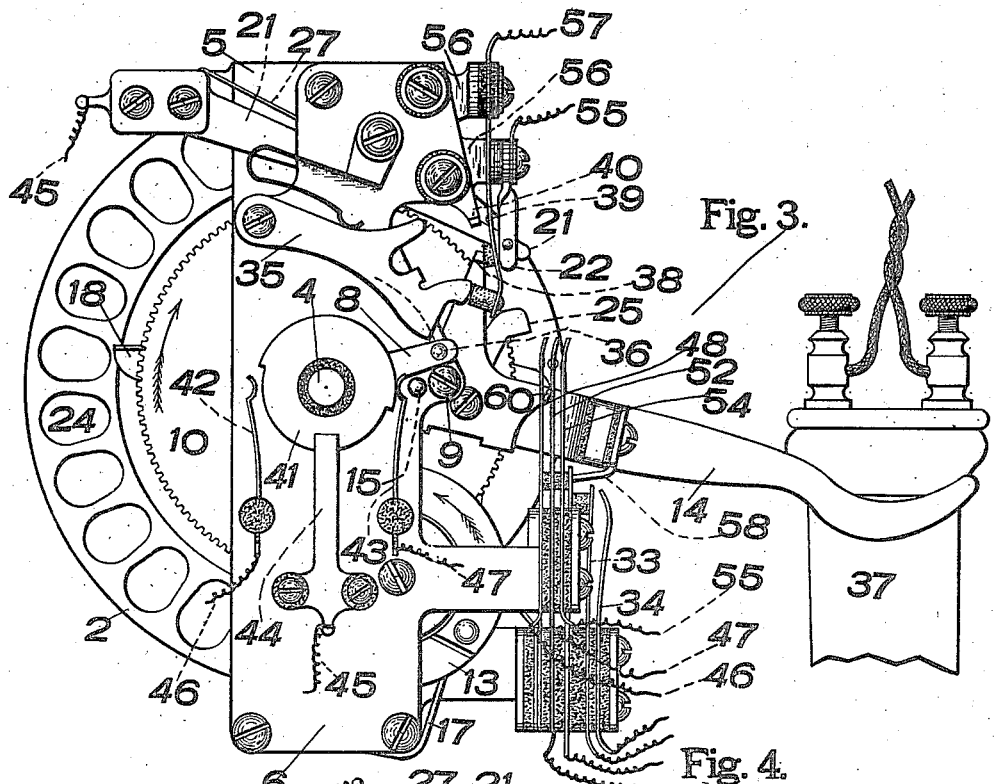

A. E. KEITH & J. & C. J. ERICKSON.
CALLING DEVICE FOR AUTOMATIC TELEPHONE EXCHANGES.
APPLICATION FILED MAY 4, 1903.
1,151,541.
Patented Aug. 24, 1915.
5 SHEETS—SHEET 1.
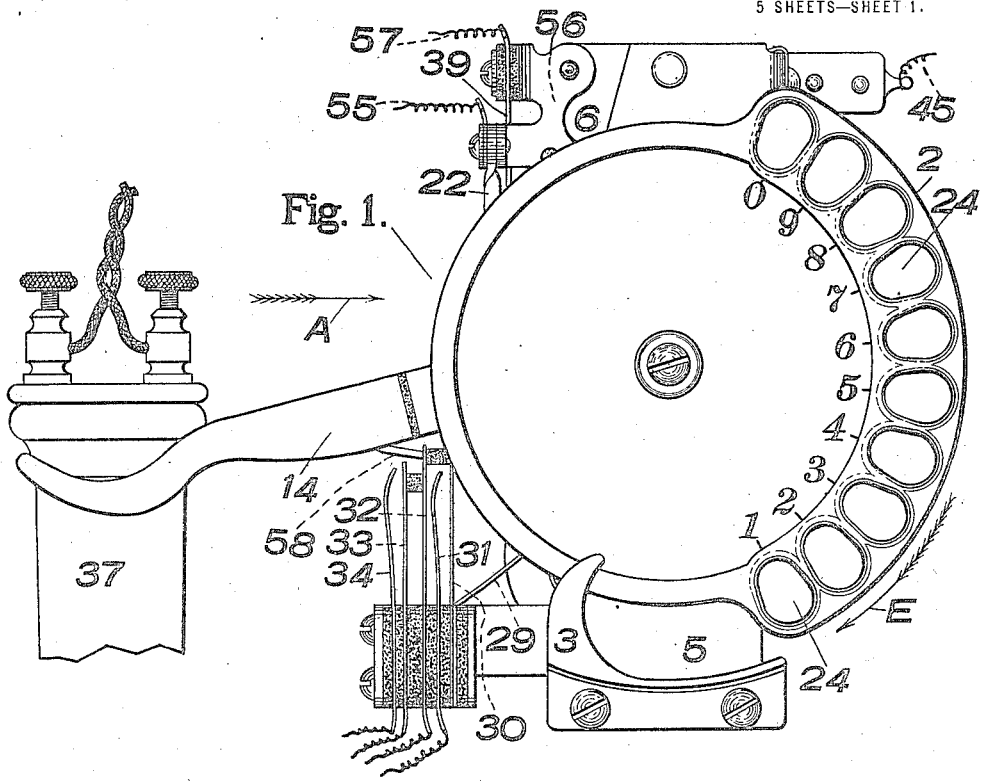
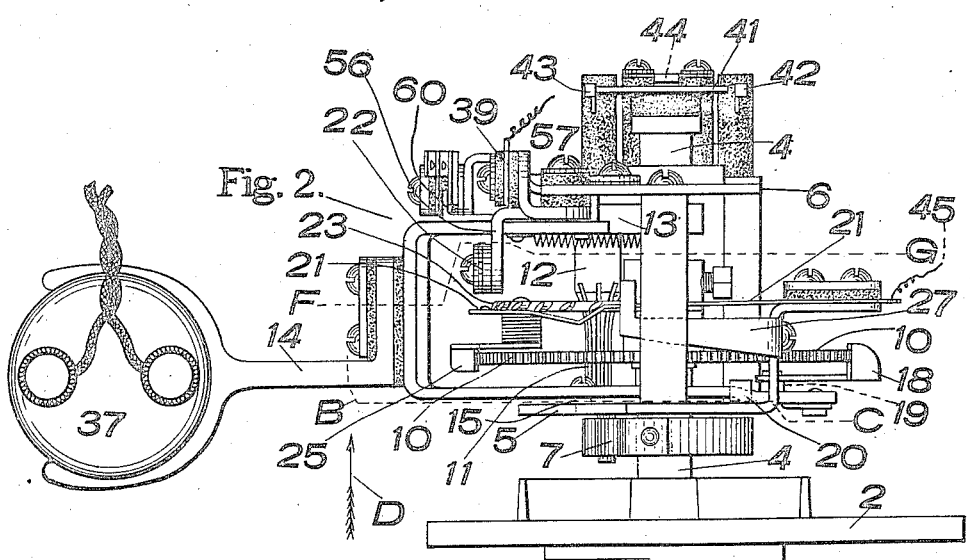
WITNESSES:
F. Lubberger.
O. Stephensen.
INVENTORS:
Alexander E. Keith,
John Erickson,
Charles J. Erickson,
By Oscar Snell,
Atty.

A. E. KEITH & J. & C. J. ERICKSON.
CALLING DEVICE FOR AUTOMATIC TELEPHONE EXCHANGES.
APPLICATION FILED MAY 4, 1903.

1,151,541.

Patented Aug. 24, 1915.
5 SHEETS—SHEET 2.

WITNESSES:
F. Lubberger.
O. Stephensen.

INVENTORS:
Alexander E. Keith,
John Erickson,
Charles J. Erickson,
By Oscar Snell,
Atty

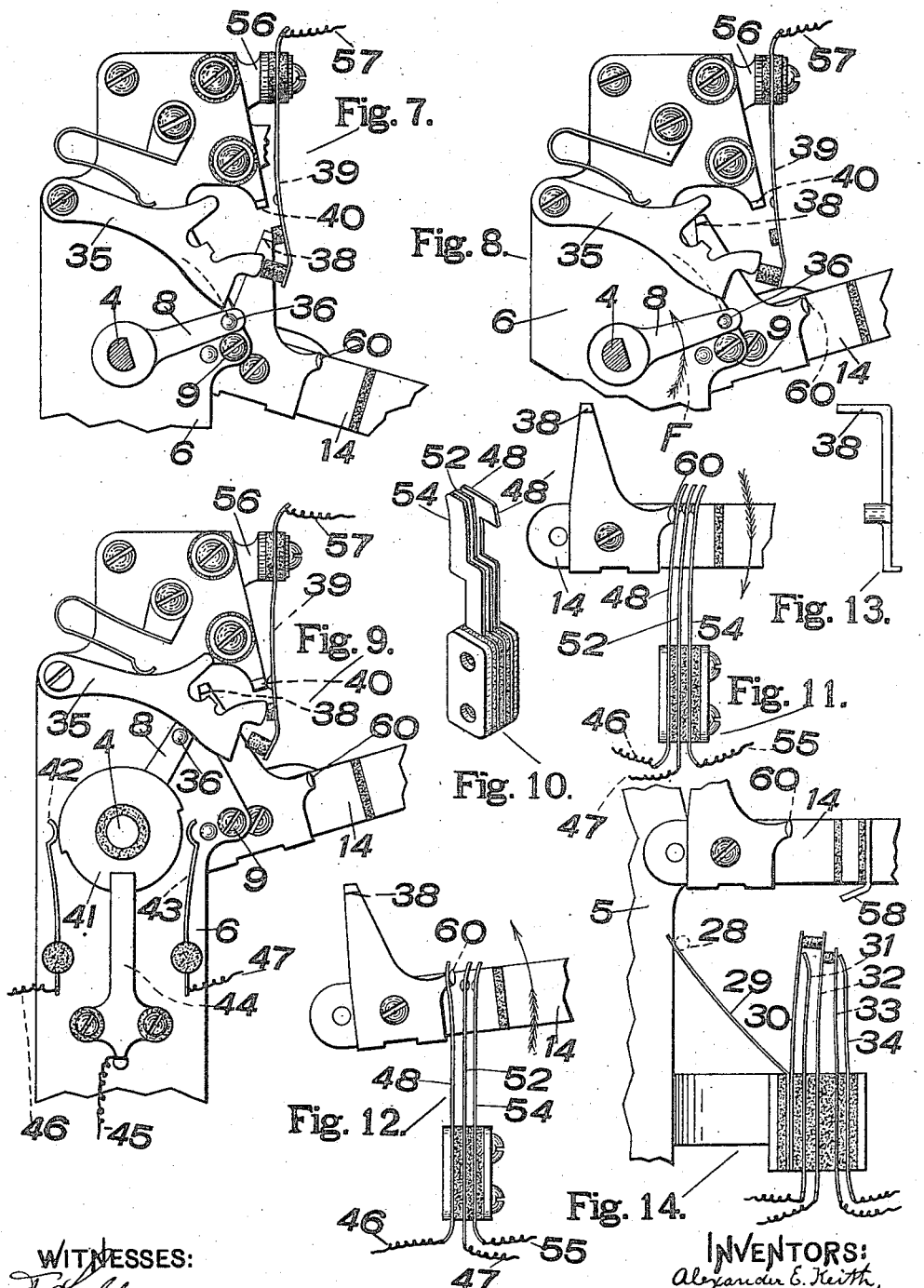

A. E. KEITH & J. & C. J. ERICKSON.
CALLING DEVICE FOR AUTOMATIC TELEPHONE EXCHANGES.
APPLICATION FILED MAY 4, 1903.
1,151,541.
Patented Aug. 24, 1915.
5 SHEETS—SHEET 5.
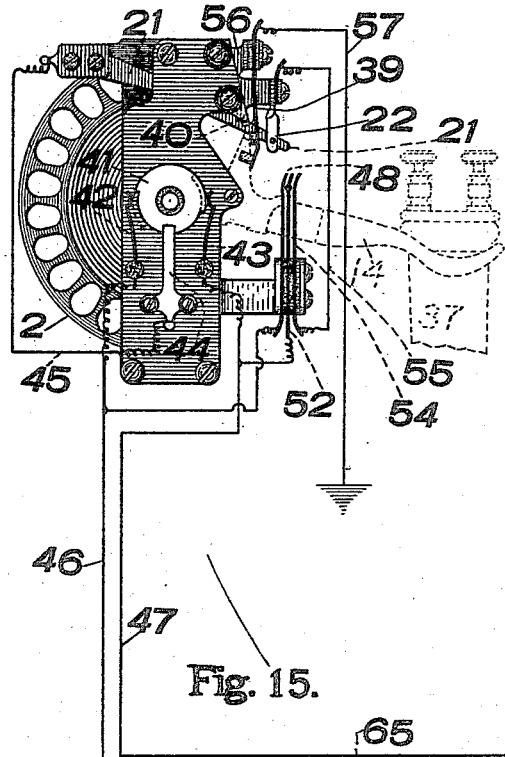
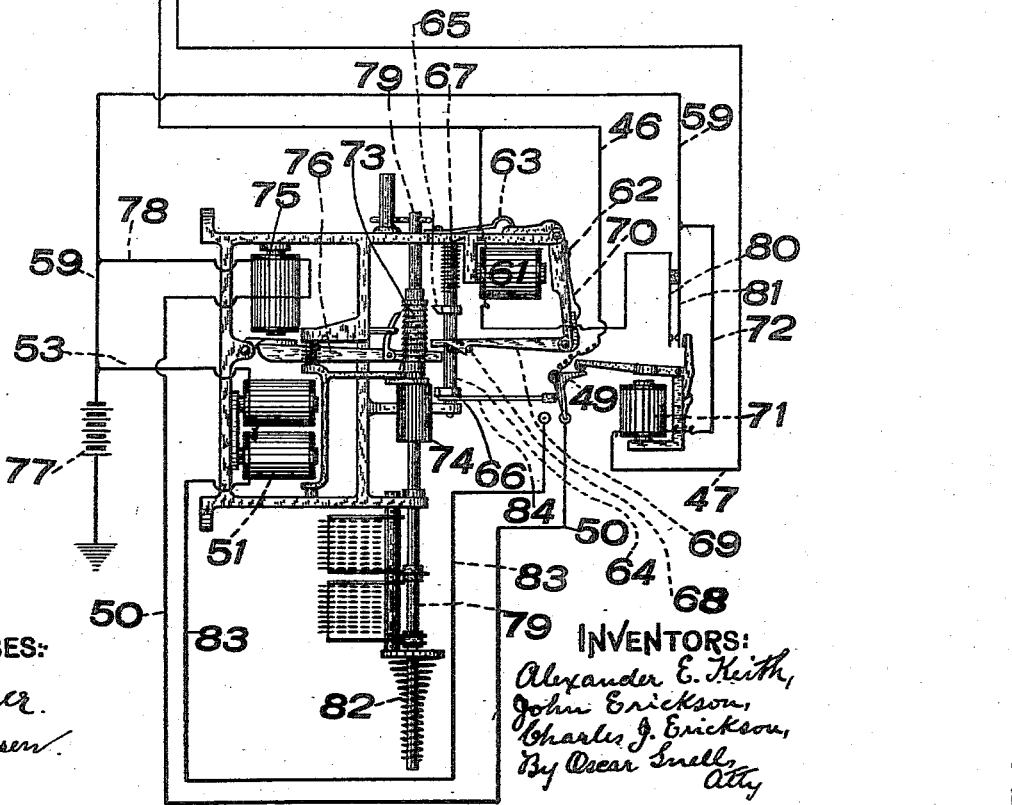
Fig. 15.
WITNESSES:
F. Lubberger.
O. Stephensen.
INVENTORS:
Alexander E. Keith,
John Erickson,
Charles J. Erickson,
By Oscar Snell,
Atty

UNITED STATES PATENT OFFICE.

ALEXANDER E. KEITH, OF HINSDALE, AND JOHN ERICKSON AND CHARLES J. ERICKSON, OF CHICAGO, ILLINOIS, ASSIGNORS, BY MESNE ASSIGNMENTS, TO FIRST TRUST AND SAVINGS BANK, TRUSTEE, OF CHICAGO, ILLINOIS.

CALLING DEVICE FOR AUTOMATIC TELEPHONE-EXCHANGES.

1,151,541.  Specification of Letters Patent.  Patented Aug. 24, 1915.

Application filed May 4, 1903. Serial No. 155,582.

*To all whom it may concern:*

Be it known that we, ALEXANDER E. KEITH, JOHN ERICKSON, and CHARLES J. ERICKSON, ALEXANDER E. KEITH residing at Hinsdale, in the county of Dupage and State of Illinois, and JOHN ERICKSON and CHARLES J. ERICKSON both residing at Chicago, in the county of Cook and State of Illinois, have invented a new and useful Calling Device for Automatic Telephone-Exchanges, of which the following is a specification.

Our invention relates to means at a subscriber's station for controlling through a plurality of line wires electrical impulses through the magnets which operate switching devices comprising either a simple or automatic telephone or telegraph exchange or central station, and our object is to provide for this purpose a more perfect construction than in the invention embodied in our patent of the United States, dated January 11, 1898, number 597,062, in which we employ as, in the present invention, a step by step circuit breaker and a circuit changer, whereby a person at one station may intermittently and alternately energize a plurality of electro-magnets, one at a time, at the central station, the initial movements of the operator being transmitted to the device by means of a series of movable finger holds, which may be arranged in many different forms and adapted to be interconnected with the calling device switching mechanism in many different ways, but in this instance are disposed in circular order, concentric with a shaft, which latter is adapted to revolve by the action of a finger engaged with some one of the holds, and operating against the resiliency of a spring, the latter being wound up a different amount for the movement of each finger-hold, and when any particular finger-hold has been moved up to a stop and then released the tension of the spring causes the parts to return to the normal position, at a moderate rate of speed by virtue of a simple governing mechanism, causing the switching devices in this return movement to serve as mediums through which an intermittent current of electricity is permitted to pass through a particular one of a plurality of wires, each connected to a motor-magnet to be energized at the central station.

The particular improvements embodied in the present invention over the invention set forth in the hereinbefore named patent consist of a better construction of the circuit changer and a better means for producing the required number and duration of intermittent currents over any one or all of a plurality of circuits as may be necessary for the duty of operating a simple or automatic telephone exchange.

Still another improvement consists in means for locking the means through which the mechanism is manipulated by virtue of the telephone receiver, until after the latter is removed, to prevent any one from carelessly interfering with the regular cycle of successive movements and thereby preventing the central exchange mechanism from being partially operated and not released to the normal or first position ready for another call.

The mechanism by which these results are attained comprises a plurality of circuits, in this instance five, the calling, local battery, ringing, receiver and release circuits, two of which, the calling and the release each has a plurality of terminals or contact points, part of which terminals are adapted to be closed successively, as by an intermittent circuit closer or wheel provided with teeth or contact makers in making a call, other terminals are adapted to be closed alternately as by a circuit changer for causing a current to be passed over the calling circuit alternately to operate the switching mechanism at the central exchange, other terminals are adapted to be closed simultaneously to release the switching mechanism at the end of a call, as by the descent of the receiver hook when the receiver is hung up, and the other terminals are adapted to be closed in such order or manner as will be necessary to complete the circuits in making a call. Said mechanism is described hereinafter and illustrated in the accompanying drawings, in which—

Figures 1, 2, 3 and 4 show, respectively, a front elevation; a plan; a rear elevation; and a side elevation looking in the direction indicated by arrow A, Fig. 1, of the frame and operative mechanism. Fig. 5, is a transverse vertical section on broken line B, C, Fig. 2, looking in the direction indicated by arrow D. Fig. 6 is a transverse vertical section on broken line F, G, Fig. 2, looking in the direction opposite to that indicated by arrow D. Figs. 7, 8 and 9 are elevations of a portion of the rear frame plate and mechanism attached thereto in several relative positions, to illustrate action of switching devices. Fig. 10 is a perspective view of a group of three switch springs, as they appear when removed from the other mechanism, to plainly illustrate the relative position of a projection on one spring which is adapted to be contacted by a projection on the telephone receiver hook lever for closing the springs and the electric circuit therethrough. Fig. 11, is a side elevation of the springs shown in Fig. 10, together with the inner end portion of the telephone receiver hook lever in the position when the springs are closed by the descent of this lever. Fig. 12, is the same as Fig. 11, but with the telephone receiver hook in a different position from that shown in Fig. 11, to illustrate the action of the upward movement of the telephone receiver hook lever, without closing the switch springs. Fig. 13, is an edge elevation of a part which is attached to the telephone hook lever, as plainly shown in Fig. 11, and is provided with two laterally projecting arms for operating the switch spring mechanism shown in Figs. 7, 8 and 9, and for closing the switch spring shown in Figs. 11 and 12. Fig. 14 is an elevation of a part of the rear of the frame with a portion of the inner end of the telephone hook lever pivotally attached thereto, and in a raised position, when a series of switch springs different from those above referred to are in the closed position, on account of being out of contact with a projection from the telephone hook lever, which opens the spring when in the lowest or normal position illustrated in Figs. 1, 3, 5 and 6. Fig. 14, also illustrates, in a small broken circular line, the position of a stop pin on one of the rotative parts against a spring, which places one of the switch springs of the group shown in electrical connection with the frame of the device, whenever the finger-hold disk and the impulse switch wheel are in normal positions shown in Figs. 1 and 6. Fig. 15 is diagrammatic, to illustrate the operation of the calling device when placed in electrical connection with an automatic telephone exchange switch at a central exchange, and is fully described hereinafter.

Similar numerals indicate like parts throughout the several views.

The mechanism shown in the drawing herewith is all inclosed in a suitable protective case, not shown, with the exception of the finger-hold disk or actuator 2, finger stop 3, and a portion of the front end of shaft 4, Fig. 2. Disk 2 is firmly mounted on and insulated from the outer end of shaft 4, which latter is disposed through the central portion of the device, and revolubly mounted in the front and back plates 5 and 6 of the main frame. At the rear of disk 2 is a volute spring 7 having one end attached to shaft 4, and the other end to the main frame. Shaft 4 and disk 2 are held in the normal position Fig. 1, against the resiliency of spring 7 by an arm 8, Figs. 3, 7, 8 and 9, attached to the rear end of portion of shaft 4, which arm contacts a pin projecting from the main frame and forms, in this position, an electrical connection therewith.

Loosely mounted on shaft 4 is a wheel 10 which is provided with fine teeth, so as to serve as a ratchet wheel, and as a cog wheel adapted to engage a small pinion 11 on shaft 12 upon which latter is mounted at the opposite end from pinion 11 a centrifugal speed governor 13, for regulating, by a variable frictional contact with a concentric stationary boss, the speed of revolution of not only wheel 10, to which it is directly geared through pinion 11 integral with shaft 12, but the release or return movement to the initial position of finger-hold disk 2, the attached shaft 4 thereof, and all the depending parts hereinafter described, for the purpose of preventing the desired intermittent electric currents, for operating the magnets of the central exchange switches, being transmitted too rapidly, for well known reasons.

In Fig. 5 is shown the wheel 10 and a portion 13 of the governing mechanism, and it also shows the inner end portion of the telephone hook-lever 14, which is pivotally attached to the main frame at 15.

Figure 4:
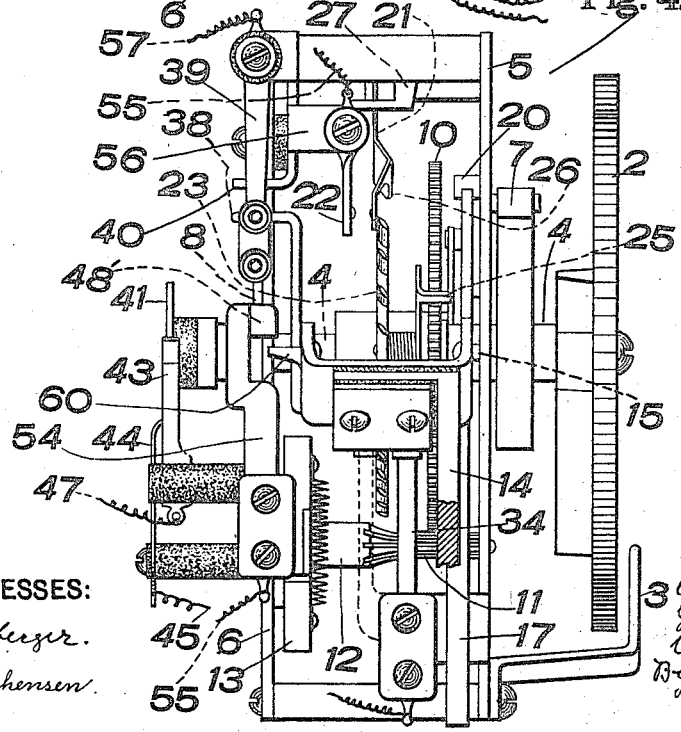
Figure 5:
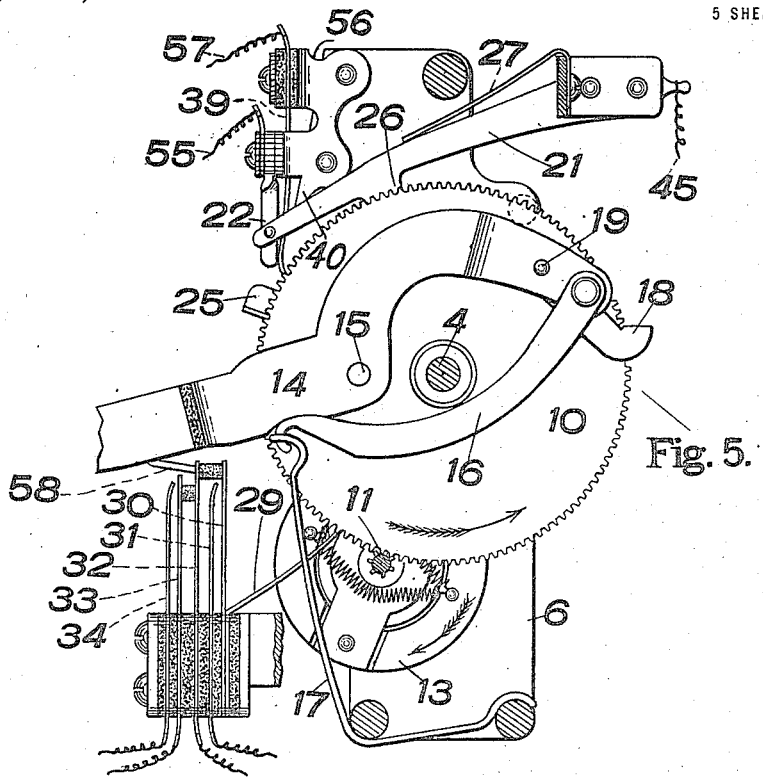
Figure 6:
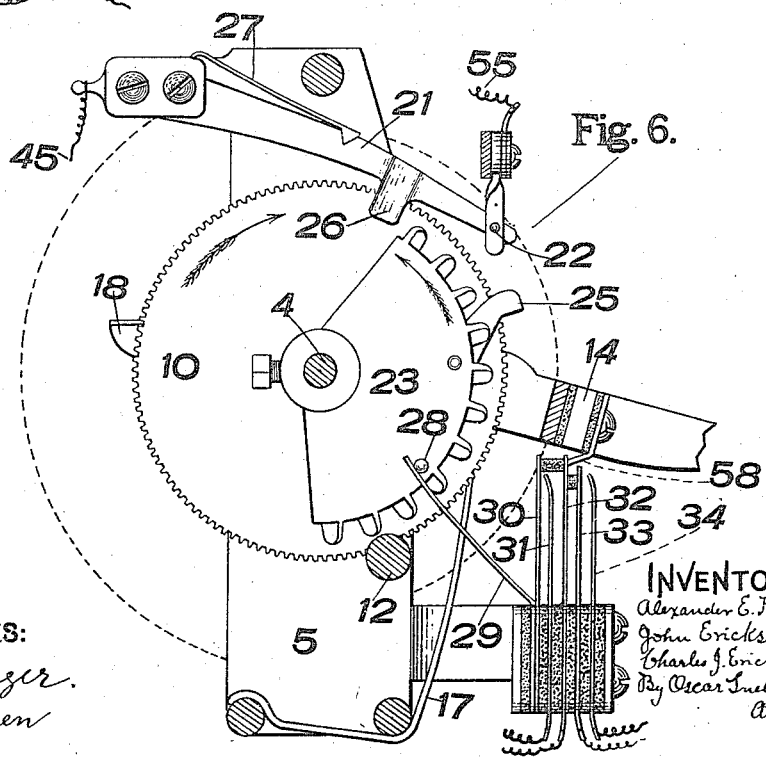

At 16, Fig. 5, and not shown in Figs. 2 and 4, is a bent rod pivotally attached to the short end of lever 14, the other end of the rod being in engagement with the end of a spring 17 which is attached to the lower end of the main frame, and serves to lift the telephone receiver hook lever 14 to the second position, as in Figs. 8 and 9, after the removal of the receiver.

A pawl 18, Figs. 2, 3 and 6, is pivotally attached to lever 14 at 19, Fig. 5, and is adapted to engage the teeth of wheel 10.

Stop 20, Figs. 2 and 4, projects from the inside of the front frame plate 5, and serves to limit the downward movement of lever 14 under the weight of the telephone receiver, against the resiliency of spring 17.

Figs. 2, 4, 5 and 6 plainly show a make and break terminal or contact as a spring arm 21 which is attached at one end to and in electrical connection with the main frame, at one side thereof, and the free end projects inwardly and through the frame to the opposite side where it is adapted to contact a pendant terminal 22 which is attached to and insulated from the frame plate 6.

Firmly secured to shaft 4 is a segment wheel 23, Fig. 4, provided with a series of eleven actuators, as teeth or projections which form contact makers and number one more than the number of finger holds 24 in disk 2 and pivotally attached to wheel 23 is a pawl 25 which engages cog wheel 10.

There is a projection 26, Figs. 5 and 6, from make and break spring arm 21 which is disposed at a slight angle in unison with a lateral bend in the arm, and is adapted to engage the teeth of segment wheel 23, so as to cause the outer end of the arm to successively and intermittently contact the pendant terminal 22 as many times as there are teeth in the wheel 23, when the latter is moving in one direction of revolution, but on account of the bevel on the teeth of wheel 23, and the angular disposition of the projection 26 relative to the wheel, the arm is held from contacting the terminal 22 when the wheel is moving in the opposite direction.

At 27 is a spring having one end in light contact with spring arm 21, to prevent undue lateral vibration of the latter.

A pin 28, Figs. 6 and 14, projects from segment wheel 23 which is in electrical connection with the frame of the device. Pin 28 is normally in contact with a spring 29, Figs. 1, 5, 6 and 14 and the latter is in electrical connection with a member 30 of a spring compound switch consisting of terminals or contact points as springs 30, 31, 32, 33 and 34.

Springs 33 and 34 are for the local battery circuit for the transmitter. Spring 32 and the projection 58 from telephone hook lever which is connected with the frame are in the ringing circuit. Springs 29 to 30 and 30 to 31 are in the receiver circuit. Since these springs are in circuits not particularly essential to illustrate this invention, except to show the relation of part of their terminals or contact points to the telephone receiver hook and to the intermittent circuit closer of the calling circuit, no further description is necessary.

In Figs. 3, 7, 8 and 9, is shown an arm 35 having one end pivotally mounted on the rear frame plate 6, and serves not only as a lock to prevent the finger-hold disk from being turned out of the normal position until after the telephone receiver is removed from the hook, but also in combination with a projection from the telephone hook lever serves to close a switch spring or terminal and hold a certain circuit closed during the time required for a call and a conversation, and is only moved to the first or normal position as a lock for the finger hold disk after the telephone receiver has been replaced upon the hook after a call is made or conversation ended, the movements of the several parts to attain this result being as follows: The normal position of the stop arm 8 is against pin 9, Figs. 3, 7 and 8, when the arm 35 is in the position shown in Figs. 3 and 7, with the lower end thereof in the path indicated by the circular broken line of a projecting pin 36 or stop arm 8, which position prevents any upward movement of the latter or of the connected finger-hold disk. If, now, the telephone receiver 37 is removed from the hook, and the lever 14 rises by virtue of spring 17, a projection 38 on the lever contacts arm 35, and the latter is lifted to the position shown in Fig. 8, above the path of the pin 36 on stop arm 8, in which position arm 35 still holds switch spring or terminal 39 out of contact with the terminal 40, which latter is in electrical connection with the pendant terminal 22, but should the finger hold disk be moved in the direction indicated by arrow E, Fig. 1, which causes the stop arm 8 to move as indicated by arrow F, Fig. 8, the pin 36 on stop arm 8 serves to lift arm 35 to the position shown in Fig. 9, when switch spring 39, being released, falls into contact with 40, and through it is placed in electrical connection with terminal 22.

The calling device circuit changer comprises a disk 41, mounted in insulating material on the rear end of shaft 4. One half of disk 41 is of smaller diameter than the other, and therefore out of reach of two insulated springs or terminals 42 and 43 which are so disposed that the free end of but one spring at a time is in contact with the disk. A spring 44 secured to the main frame in insulating material, Figs. 3 and 4, is in contact with disk 41 and serves to always electrically connect the disk through wire 45, Fig. 15, with make and break spring arm 21. In this manner the disk has two contact points, one of which is the flat surface with which the spring or terminal 44 of one of the circuits contacts at all times, and the other one is the periphery of the larger portion and is movable into and out of engagement with either of the terminals 42 and 43 of the other circuit, said terminals 42 and 43 being preferably diametrically opposite to each other and in such position as to engage only with the periphery or larger portion of the disk.

In the diagrammatic view, Fig. 15, is shown the calling device, and an automatic telephone exchange switch connected by line wires 46 and 47; line wire 46 being bifurcated and connected at one end to switch springs or terminals 42 and 48 at the calling device, and at the other end, at the central exchange is normally in electrical connection with the battery through circuit changer switch arm 49, wire 50, vertical magnet 75, and battery wire 59. The other line wire 47 is bifurcated and connected at the calling device with switch springs or terminals 43 and 52 and the end at the central exchange with an auxiliary switch magnet 71, wire 72 and battery wire 59, the auxiliary magnet serving to operate the circuit changing switch arm 49.

Switch spring 39 at the calling device is insulated from the part to which it is attached, but is brought into contact therewith when the calling device is in electrical connection from ground through wire 57 and the pendant terminal 22 which is attached to part 56, and which we hereinafter refer to.

There are a number of switch springs 30, 31, 32, 33 and 34 shown in Figs. 1, 5, 6 and 14, which are connected with the talking and ringing circuit, not shown, but these springs are for the purpose of opening this circuit by the gravity of the telephone receiver, when on the hook, as shown in Figs. 1, 5 and 6, where a projection 58 from the telephone hook lever 14 contacts and moves spring 32, which, through the pads of insulating material between springs 32 and 33 and 30 and 32 causes springs 33 and 34 and 30 and 31 to separate. After the telephone is removed from the hook, the above named springs assume the position shown in Fig. 14, with the circuit closed.

Switch springs 48, 52 and 54 form triple terminals which serve to control the electric current for releasing the switch mechanism at the central exchange, so that it may return to the initial position ready for another call, and these springs are shown in the open position in Figs. 3, 10, 12 and 15.

The action of the telephone lever in closing the release circuit is shown in Figs. 12 and 13.

In Figs. 4 and 10 is plainly shown a lateral projection 48¹ from the inner spring 48 which is in the path of a projection 60 from the telephone lever 14.

When the telephone lever is rising after the removal of the telephone, projection 60 engages the projection 48¹ on the concave side shown in Fig. 10 and moves it away from the adjacent spring 52, as shown in Fig. 12, but when the lever is descending the projection 60 contacts the opposite or convex side of the spring projection 48¹ and moves the spring first, into contact with center spring 52, when these springs are connected, respectively, with line wires 46 and 47 then, by this contact and further downward movement of projection 60 center spring 52 is brought into contact with outer spring 54, as shown in Fig. 11, when both springs 48 and 54 are in connection through wire 55 with terminal 22, Fig. 15, the insulated part or bracket 56 and the terminal 40 thereof, and with the ground wire 57, if spring 39 is in contact with the terminal 40, as shown in Fig. 9.

The triple switch springs or terminals 48, 52 and 54 are in the central exchange switch release circuit, and the manner in which these springs are operated by the descent of the telephone lever 14 produces the effect of an electric current passing, at one time, through both line wires 46 and 47, for the purpose of effecting the release to the normal condition of a central station switch, from a substation, without the necessity of a third line wire.

The means by which the switch shaft is released from its operated position comprises the release magnet 61 (Fig. 15) which is provided with an armature 62 to the lower end of which is attached an arm 69. The spring 63 normally holds the armature 62 in the position shown.

64 is a detent shaft upon which are secured two detents 65 and 66, which, respectively engage with the teeth of the vertical ratchet 73 and the rotary ratchet 74, on switch shaft 79 when the instrument is being operated. The helical spring 67 holds detents 65 and 66 in yielding engagement with the ratchets.

A pin 68 projects from detent shaft 64 and is disposed in the path of movement of a bent lever catch-pawl 69, which latter is yieldingly held in position by spring 70.

At 75 is the vertical magnet whose armature is attached to lever 76 to which is pivoted a pawl for engaging vertical ratchet 73 in operating shaft 79 step by step vertically. Lever 76 projects to within a short distance of detent shaft 64, so that, when this lever is operated by the vertical magnet 75, the outer end of the lever is adapted to strike the inwardly projecting end of release pawl 69, and remove the latter from engagement with the detent shaft pin 68, and permit the detents 65 and 66 to be moved by virtue of helical spring 67, into engagement, respectively, with vertical ratchet 73 and rotary ratchet 74 at the proper time. When the detent shaft 64 is operated so as to lift detents 65 and 66 from engagement with ratchets 73 and 74 a rod 84, having one end pivotally attached to detent 66 and the other tipped with insulation, contacts with and moves the switch lever 49 from connection with wire 83 to connection with wire 50 or into its normal condition.

In operation, if it is desired to set a subscriber's telephone switch at the central exchange to communicate, for instance, with telephone switch and telephone number 35, first remove the telephone receiver from the hook when arm 35, at the calling device will be moved from the position shown in Fig. 7 to that shown in Fig. 8, when arm 8, shaft 4, and the finger-hold disk 2 are free to move. Referring to Fig. 1, the operator now places a finger in contact with finger-hold No. 3, which is pulled down around in the direction indicated by arrow E, until the finger contacts the stop 3 and is withdrawn, when finger-hold disk 2 is released and by virtue of spiral spring 7 carried backwardly, together with shaft 4, and connected segment wheel 23 to the normal position. In thus manipulating the finger-hold disk, the first movement downwardly, causes the arm 8 to assume a position similar to what is shown in Fig. 9, and lift the arm 35 from the position shown in Fig. 8, when contact spring 39 falls into electrical connection with arm 40 of the insulated part 56 which is in electrical connection with pendant terminal 22, Figs. 1, 2 and 4. Also in the first movement downwardly, the insulated circuit changer has been moved from the position shown in Fig. 3 to the position shown in Fig. 9, or the segmental broken lines in Fig. 15, out of contact with switch spring 43 and into contact with switch spring 42. In the second or backward movement, on account of segment wheel 23 having one more beveled tooth of the whole number than in the whole number of finger-holds on plate 2, and this extra tooth being placed angularly ahead, relatively to the arrangement of the finger-holds, the segment wheel teeth operating spring arm 21, causes the latter to separately contact pendant terminal 22, four times instead of three, when the first three of these impulses pass from battery 77 wires 59 and 78, vertical magnet 75 wire 50 switch arm 49 line wire 46 then to the calling device, spring 42, disk 41, spring 44, wire 45, spring arm 21, terminal 22, part 56, arm 40 then spring 39, wire 57 to ground, and by electro-magnet 75 operate main switch shaft 79 three upward steps. But just before the last electrical impulse of the four above described, the circuit changer disk 41 has been moved from the position in contact with spring 42 to contact with spring 43, when this last impulse passes from battery 77 through wire 59, wire 72, auxiliary electro-magnet 71 and line wire 47, spring 43, disk 41, spring 44, wire 45, spring arm 21, pendant terminal 22, part 56, arm 40, spring 39 and wire 57 to ground, causing the auxiliary electro-magnet 71, to operate the switch arm 49 so that, line wire 46 is moved out of connection with wire 50 and into connection with wire 83, which leads to the rotary electro-magnet 51. This far main switch shaft 79 has been lifted three steps, and communication established with the rotary magnet, which before was cut out of circuit. If now, the finger-hold disk is moved from the fifth hold to the stop, and six impulses sent over the line wires, five of these impulses would pass from battery 77 through wire 53, electro-magnet 51, wire 83, then the moved switch arm 49, wire 46 spring 42, disk 41, spring 44, wire 45, spring arm 21, pendant arm 22, part 56, arm 40, spring 39 and wire 57 to ground and thereby causing rotary magnet 51 to revolve shaft 79 five steps. When the disk 41 changes the circuit from line wire 46 to 47 the effect is to simply operate the armature of auxiliary magnet 71, which would have no effect upon switch lever 49 since it would be in the second position in communication with wire 83.

In the manner described the switch shaft 79 would have a wiper arm in electrical connection with contact point No. 35 of some subscriber's line not shown.

In the operation of release, a subscriber hangs the telephone on the hook when arm 14 descending in the manner hereinbefore described, causes the switch spring 52 and 48 to first contact, and thus connect line wires 46 and 47, then they are grounded simultaneously by being brought into contact with spring 54, which causes a simultaneous current over both main lines 46 and 47, with the result, that the auxiliary magnet is operated to close springs 80 and 81, when current passes through release magnet 61, closing its armature 62, and permitting the hook arm 69, attached thereto, to engage with the pin 68, which projects from detent shaft 64, and when the circuit is broken by the additional descent of telephone lever 14, the strong spring 63 controlling lever armature 62 lifts the latter and withdraws the pawls 65 and 66 to the position shown clear of ratchets 73 and 74, and moves the rod 84 so as to return the switch lever to its normal position, when the main switch shaft 79 is free to return to the initial position by virtue of gravity and the spring 82 at the lower end portion.

We claim as our invention:

1. A device of the character described comprising a plurality of circuits, an intermittent circuit closer adapted to be included in either of said circuits, a circuit controller, means for operating the closer and controller alternately, and means for closing said circuits simultaneously.

2. A device of the character described comprising two circuits, an intermittent circuit closer adapted to be included in either circuit, a circuit controller, and means for closing said circuits simultaneously, substantially as described.

3. A device of the character described comprising two circuits, an intermittent circuit closer adapted to be included in either circuit, a circuit controller, a receiver hook, and means connected with the receiver hook for closing said circuits simultaneously, substantially as set forth.

4. A device of the character described comprising a circuit having two circuit-closing means, one of which is adapted, when operated, to intermittently open and close the circuit and the other one is adapted to close a release circuit, a telephone receiver support movably mounted and having connection with said other circuit-closing means to hold said circuit open until said receiver support is moved in one direction, substantially as set forth.

5. A device of the character described comprising a plurality of circuits, an intermittent circuit-closer and a circuit-changer connected to move in unison, the circuit-changer having a single contact surface adapted for successive engagement with one terminal of each circuit, and the circuit-closer having contact means for making electrical connection with each of said terminals through the contact surface of the circuit-changer, substantially as set forth.

6. In a telephone exchange calling device, a plurality of circuits, the calling and releasing circuits of which each has a plurality of terminals, an intermittent circuit closer, a circuit changer having two contact points, one of which is common to said calling circuits and the other point is movable into and out of engagement with either of two of the terminals of said two circuits, and means for operating the changer during the operation of the circuit closer.

7. In a telephone exchange calling device, a plurality of circuits, two of which are each provided with a plurality of terminals, a circuit closer provided with a plurality of contact makers, a circuit changer having two contact points, one of which is common to both of said two circuits and the other one is movable into and out of engagement with two of the terminals of said two circuits before the closing of one of the circuits by the action of the last contact maker.

8. In a telephone exchange calling device, a plurality of circuits, two of which are each provided with a plurality of terminals, a circuit closer provided with a plurality of contact makers, a finger hold piece for operating the same and having one less hold than there are contact makers, a circuit changer having two contact points, one of which is common to said two circuits and the other one is movable into and out of contact with two of the terminals of said two circuits, and means for moving said changer before the closing of one of the circuits by the action of the last contact maker.

9. In a telephone exchange calling device, a plurality of circuits, a circuit closer provided with inclined teeth, a flexible member projecting into the path of said teeth, a finger hold piece for operating the closer, and a circuit changer for changing the circuits before the last tooth engages said member.

10. In a telephone exchange calling device, a plurality of circuits, two of which are each provided with a plurality of terminals, an intermittent circuit closer and a circuit changer, said changer being provided with two contact points, one of which is flat and common to both of said two circuits and the other is curved and movable into and out of engagement with two of the terminals of said two circuits.

11. In a telephone exchange calling device, a plurality of circuits, an intermittent circuit closer, three terminals, one of which is common to two of said circuits, and a substantially circular, disk-like circuit changer, the periphery of which is of two diameters, one face of the disk being in constant contact with one of said three terminals and the portion of the periphery having the larger diameter being movable into and out of engagement with either one of the other terminals.

12. In a telephone exchange calling device, a plurality of circuits, two contact closers, one of which is adaptaed to alternately close said circuits intermittently when making a call, and the other one is adapted to close both circuits simultaneously when the call is completed, a receiver hook, and means for operating said closers, the means for closing the circuits simultaneously being controlled by the receiver hook.

13. In a telephone exchange calling device, a rotary intermittent circuit closer adapted to rotate forward and back, a lock for holding the same against movement, and a movable telephone receiver hook provided with means for releasing said circuit closer as the hook is being raised.

14. In a telephone exchange calling device, a rotary intermittent circuit closer adapted to rotate forward and back, a lock for holding the same against movement, and a movable telephone receiver support provided with a shoulder for engaging with the lock and releasing it as the support is being raised.

15. In a telephone exchange calling device, two circuits, each provided with a plurality of movable terminals, an intermittent circuit closer for closing one of the circuits intermittently through a part of the terminals, a lock for controlling the movement of one of said terminals and for locking the closer against movement, and means for releasing said lock.

16. In a telephone exchange calling device, two circuits, each provided with a plurality of terminals, an intermittent circuit closer for one of the circuits, and means for locking the closer against movement and also for holding the terminals of the other circuit separated.

17. In a telephone exchange calling device, two circuits, each provided with a plurality of terminals, an intermittent circuit closer for one of the circuits, a lock for holding the terminals of the other circuit separated, and a telephone receiver support provided with means for releasing said lock.

18. In a telephone exchange calling device, a plurality of circuits, two of which each has a plurality of terminals, means for closing part of said terminals by the telephone receiver hook when it is moved in one direction, and means for closing other of said terminals before the first mentioned part of the terminals are separated when the hook is moved in the opposite direction.

19. In a telephone exchange calling device, a plurality of circuits, two of which each has a plurality of terminals, an intermittent circuit closer for one of the circuits, a receiver hook, means for locking said closer against movement, means for unlocking the circuit-closer when said hook is raised, means for closing part of the terminals of one circuit and releasing the intermittent closer when the telephone receiver hook is moved in one direction, and means for closing a part of the terminals of the other circuit before the first mentioned part of the terminals are separated when the hook is moved in the opposite direction.

20. In a telephone exchange calling device, a plurality of circuits, two of which each has a plurality of terminals, a receiver hook, means for closing part of the terminals of one of the circuits by the telephone receiver hook when it is moved in one direction, and means for simultaneously closing part of the terminals of the other circuit before said first mentioned part of the terminals are separated by the hook when it is moved in the opposite direction.

21. In a telephone exchange calling device, a plurality of circuits, part of which each has a plurality of terminals, means for closing part of the terminals of one of said circuits when the telephone receiver hook reaches the limit of its upward movement, means for closing other terminals when the hook reaches the limit of its downward movement, and means for closing still other of said terminals when the hook is at a point intermediate said limits on its downward movement.

22. In a telephone exchange calling device, a plurality of circuits, a circuit changer, and means for simultaneously closing the terminals of two of said circuits by the descent of the telephone receiver hook, one of which terminals is adapted to control a releasing circuit.

23. In a telephone exchange calling device, a plurality of circuits, a plate for controlling one of said circuits, a telephone receiver hook provided with three shoulders, one of which is adapted to engage with said plate, and the other two control respectively the terminals of other of said circuits.

24. In a telephone exchange calling device, a frame, a shaft journaled therein, an actuator secured to one end of the shaft and a circuit changer to the other, means for limiting the movement of the actuator, contacts for engaging with the changer, an intermittent circuit closer mounted on the shaft within the frame, and a lock for preventing the movement of the actuator until after the telephone receiver has been removed from its support.

25. In a telephone exchange calling device, a frame, a shaft journaled therein, an actuator and a circuit changer secured to but insulated from the respective ends of the shaft, means for limiting the movement of the actuator, contacts for engaging with the changer, one of which is electrically connected with the frame and two are adapted to engage with the circuit changer alternately, an intermittent circuit closer mounted on the shaft within the frame, and a lock for preventing the movement of the actuator until after the telephone receiver has been removed from its support.

26. In a telephone exchange calling device, a frame, a shaft journaled therein, an actuator and a circuit changer secured to but insulated from the respective ends of the shaft, means for limiting the movement of the actuator, contacts for engaging with the circuit changer, one of which is electrically connected with the frame and two are adapted to engage with the circuit changer alternately, a flexible terminal secured to the frame at one end, an insulated terminal on the frame in position to be engaged by the spring terminal, a toothed wheel on the shaft in position for engaging with said spring terminal intermittently and forcing its free end into engagement with the insulated terminal, and means for electrically connecting the circuit changer with said spring terminal so as to pass a current over either one of two circuits.

27. In a telephone exchange calling device, a frame, a shaft journaled therein, an actuator and a circuit changer secured to but insulated from the respective ends of the shaft, means for limiting the movement of the actuator, contacts for engaging with the circuit changer, one of which is electrically connected with the frame and two are adapted to engage with the circuit changer alternately, a flexible terminal secured to the frame at one end and provided with an inclined projection, an insulated terminal on the frame in position to be engaged by the spring terminal, a wheel on the shaft provided with inclined teeth in position to engage with said inclined projection and successively force the free end of the spring terminal into engagement with the insulated terminal when the wheel is moved in one direction but preventing such engagement when the wheel moves in the opposite direction, and means for electrically connecting the circuit changer with the spring terminal so as to pass a current over either one of two circuits.

28. In a telephone exchange calling device, a frame, a shaft journaled therein having an actuator and a circuit changer secured to but insulated from the respective ends of the shaft and an intermittent circuit closer secured to the intermediate portion, a spring for returning the shaft to its normal position, means for limiting the movement of the actuator, a lock for preventing the movement of the actuator, and means for releasing the lock by the movement of the telephone receiver hook.

29. In a telephone exchange calling device, a frame, a shaft journaled therein having an actuator and a circuit changer secured to but insulated from the respective ends of the shaft and an intermittent circuit closer secured to the intermediate portion, a spring for returning the shaft to its normal position, means for limiting the movement of the actuator, an arm for locking the actuator against movement, and means for moving the arm to release the actuator by the movement of the telephone receiver hook.

30. In a telephone exchange calling device, a frame, a shaft journaled therein having an actuator and a circuit changer secured to but insulated from the respective ends of the shaft and an intermittent circuit closer secured to the intermediate portion, a spring for returning the shaft to its normal position, means for limiting the movement of the actuator, a shouldered arm for locking the actuator against movement, and a shouldered receiver hook for engaging with the shoulder of the arm and releasing the actuator by the movement of the receiver hook.

31. In a telephone exchange calling device, a frame, a shaft journaled therein having an actuator and a circuit changer secured to but insulated from the respective ends of the shaft and an intermittent circuit closer secured to the intermediate portion, a spring for returning the shaft to its normal position, means for limiting the movement of the actuator, a shouldered arm secured to the shaft, a locking arm in position for engaging with said shoulder and locking the actuator against movement, and means for moving the lock out of engagement with the shouldered arm to release the actuator when the receiver is removed from its support.

32. In a telephone exchange calling device, a frame, a shaft journaled therein having an actuator and a circuit changer secured to but insulated from the respective ends of the shaft and an intermittent circuit closer secured to the intermediate portion, a spring for returning the shaft to its normal position, means for limiting the movement of the actuator, an insulated spring terminal, a shouldered stop arm secured to the shaft, a shouldered locking arm for engaging with the shoulder of the stop arm and locking the actuator against movement, a shouldered receiver hook for engaging with the shoulder of the locking arm to release the actuator, and means for moving the locking arm further upward and thereby permitting the terminal to form a contact with the frame.

33. In a telephone exchange calling device, a frame, a shaft journaled therein, an actuator and a circuit changer secured to but insulated from the respective ends of the shaft, contacts for engaging with the changer, one of which is electrically connected with the frame, three terminals on the frame, two of which are flexible and two of them are insulated, a contact maker on the shaft adapted to force the free end of the non-insulated terminal into contact with the rigid insulated terminal, a lock for holding the actuator against movement and also for holding the flexible insulated terminal out of contact with the frame, and means for moving said lock to release the actuator and to permit said insulated flexible terminal to contact with the frame when the receiver hook is moved upward.

34. In a telephone exchange calling device, a releasing circuit including a group of three terminals, one of which is shouldered, and a receiver hook provided with means for engaging with said shoulder and forcing all three terminals into simultaneous engagement.

35. In a telephone exchange calling device, a group of three terminals, some of which are for the calling and releasing circuits, respectively, and some of which are for the talking and ringing circuits, and means for separating the talking and ringing circuits when the receiver hook descends and permitting them to contact when it rises.

36. In a telephone exchange calling device, a frame provided with calling and release mechanism, a plurality of terminals, three of which are insulatingly secured together and two of said three are movable into and out of engagement with two other of said group and one of them is connected with the calling circuit, and a projection on the receiver hook in position for engaging with one of said three terminals and forcing said two terminals out of contact with the other two when the hook descends and permitting them to contact when the hook rises.

37. In a telephone exchange calling device, a frame, a shaft journaled therein, an actuator and a circuit changer secured to but insulated from the respective ends of the shaft, and an intermittent contact closer on the shaft within the frame, a governor mounted in the frame, one end of the shaft of which is provided with a pinion, a fine toothed wheel loosely mounted on the shaft in position for engaging with said pinion, a pawl on the circuit closer for engaging with said wheel on the return movement of the closer, and a telephone receiver hook provided with a pawl for engaging with said wheel and preventing its retrograde movement.

38. In a telephone exchange calling device, a frame, a shaft journaled therein, an actuator, a circuit changer and an intermittent circuit closer secured to the shaft and a fine toothed wheel loosely mounted on the shaft, a governor connected with said wheel, a telephone receiver hook pivotally secured to the frame, a spring-actuated rod and a pawl secured to the inner end of the hook, and a pawl on the circuit closer for engaging with said wheel on the return movement of the circuit closer.

39. In a telephone exchange calling device, a frame, a flexible terminal secured at one end thereto, means for intermittingly moving said terminal, and a brake for preventing undue vibration of the terminal.

40. In a telephone exchange calling device, a frame, a flexible terminal secured at one end thereto, means for intermittingly moving said terminal, and a spring for engaging with the top of the terminal and preventing undue vibration thereof.

41. In combination, a calling device for electrical exchanges, line limbs associated therewith, an impulse transmitter for sending currents over said limbs, actuating means therefor, a hook lever normally causing said means to be locked, and apparatus automatically worked on removal of the receiver from the hook lever to perform a preliminary switching operation and thereafter unlock said actuating means.

42. In a telephone system, a calling mechanism, said mechanism provided with a rotary calling dial adapted to rotate forward and back provided with a curved and concentric line of holes, a numeral or indicating device for each hole and means for variably limiting the forward rotation of the dial in accordance with the hole selected thereon.

43. In a telephone system, a calling mechanism, said mechanism comprising a rotary dial adapted to rotate forward and back, governing mechanism for retarding the return of said dial to normal, and means for varying the return movement of the dial.

44. In a telephone system, a calling mechanism, a hook-switch associated therewith, means operated by the downward movement of the hook-switch for releasing the said mechanism, and a governor for retarding the downward movement of the hook-switch.

45. In a telephone system, a calling mechanism, a hook-switch associated therewith, means operated by the downward movement of the hook-switch for releasing the said mechanism, and a governor operative to retard the downward movement of the hook-switch and the return movement of the calling mechanism to normal.

46. In a telephone system, a rotary impulse transmitter adapted to rotate forward and back, a switch hook, and means operated by one of said elements to control the other.

47. In a calling device for telephone exchanges, a rotary dial adapted to rotate forward and back, means for normally locking said dial against movement, and means controlled by the switch hook for unlocking said dial.

48. In a calling device for telephone exchanges, a rotary dial and a rotary impulse wheel associated therewith adapted to rotate forward and back, means normally locking said impulse wheel in position, and means controlled by the switch hook in its upward movement to release said wheel.

49. In a telephone system, an impulse transmitting device including a ground connection, a pair of normally open spring contacts for controlling said ground connection, a switch hook for normally locking said transmitter against operation, means controlled by the upward movement of said switch hook for unlocking said transmitter, and means controlled by the initial operation of said transmitter for closing said contact springs and ground connection.

50. In a telephone system, an impulse transmitting device including a rotary calling dial, a ground connection, a pair of normally open contacts controlling said connection, a switch hook normally locking said calling dial against rotation, means operated by the upward movement of said switch hook for unlocking said dial, and means controlled by the forward movement of said dial for closing said contact springs and said ground connection.

51. In a telephone system, a line circuit, a calling device including a rotary dial, and means controlled by a single operation of said dial for transmitting a plurality of impulses over one side of said line circuit, followed by a single impulse over the opposite side thereof.

52. In a telephone system, a line circuit, a calling device including a rotary dial, means for variably operating said dial, and means controlled by one of said operations of said dial for transmitting a varying number of impulses, depending upon the extent of operation of said dial, over one side of said line, followed by a single impulse over the opposite side of said line.

53. In a telephone system, a line circuit, a calling device including a rotary dial, and means controlled by each single operation of said dial for transmitting a plurality of impulses over one side of said line circuit, followed by a single impulse over the opposite side thereof.

54. In a telephone system, a line circuit, a calling device including a rotary dial, means for variably operating said dial in accordance with the digits of a called number, and means controlled by each one of said operations of said dial for transmitting a varying number of impulses, depending upon the extent of operation of said dial over one side of said line, followed by a single impulse over the opposite side of said line.

55. In a telephone system, a calling mechanism, said mechanism provided with a rotary calling dial adapted to rotate forward and back provided with a curved and concentric line of finger holds, a numerical indicating device for each hold, means for variably limiting the forward rotation of the dial in accordance with the hold selected, a rotary governing mechanism for retarding the return of the said dial to normal and automatic means for connecting the governing mechanism to the dial during the return movement thereof and for disengaging the dial from said governing mechanism upon the forward movement of the dial, said calling mechanism comprising means whereby the governing mechanism is rotated a variable amount in accordance with the variable operations of the dial.

56. In a telephone system, a calling mechanism, and means for sending impulses, said mechanism comprising a rotary dial adapted to rotate forward and back, rotary governing mechanism for retarding the return of said dial to normal, means for varying the return movement of the dial and automatic means for connecting the governing mechanism to the dial during the return movement thereof and for disengaging the dial from said governing mechanism upon the forward movement of the dial, said calling mechanism comprising means whereby the governing mechanism is rotated a variable amount in accordance with the variable operations of the dial.

57. In a telephone system, a calling mechanism, said mechanism provided with a rotary dial adapted to rotate forward and back, provided with a curved and concentric line of finger holds, rotary governing means for retarding the return of said dial to normal, means for varying the return movement of the dial in accordance with the holds selected thereon and automatic means for connecting the governing mechanism to the dial during the return movement thereof and for disengaging the dial from said governing mechanism upon the forward movement of the dial, said calling mechanism comprising means whereby the governing mechanism is rotated a variable amount in accordance with the variable operations of the dial.

58. In a telephone system, a calling mechanism for sending impulses, said mechanism comprising a rotary dial and means whereby the dial may be variably rotated forward and back, a rotary governing mechanism for retarding the return of said dial to normal, and means for gearing the governing mechanism to the dial during the return movement thereof, and for disengaging the dial from said gear upon the forward movement of the dial.

59. In a telephone system, a calling mechanism provided with a calling dial and means whereby the dial may be rotated forward and back, said dial having finger holds, a numerical indicating device associated with said holds, means for variably limiting the forward rotation of the dial in accordance with the hold selected, a rotary governing mechanism for retarding the return of said dial to normal, and automatic means for connecting the governing mechanism to the dial during the return movement thereof and for disengaging the dial from said governing mechanism upon the forward movement of the dial.

60. In a telephone system, a calling mechanism, means for sending impulses, said mechanism comprising a dial and means whereby the dial may be rotated forward and back, rotary governing mechanism for retarding the return of said dial to normal, means for varying the return movement of the dial, and automatic means for connecting the governing mechanism to the dial during the return movement thereof and for disengaging the dial from said governing mechanism upon the forward movement of the dial.

61. In a telephone system, a calling mechanism provided with a dial and means whereby the dial may be rotated forward and back, said dial provided with finger holds, rotary governing mechanism for retarding the return of said dial to normal, means for varying the return movement of the dial in accordance with the holds selected thereon, and automatic means for connecting the governing mechanism to the dial during the return movement thereof and for disengaging the dial from said governing mechanism upon the forward movement of the dial.

In testimony whereof we have signed our names to this specification in the presence of two subscribing witnesses.

ALEXANDER E. KEITH.
JOHN ERICKSON.
CHARLES J. ERICKSON.

Witnesses:
SAMUEL COLE,
OSCAR SNELL.

Corrections in Letters Patent No. 1,151,541.

It is hereby certified that in Letters Patent No. 1,151,541, granted August 24, 1915, upon the application of Alexander E. Keith, of Hinsdale, and John Erickson and Charles J. Erickson, of Chicago, Illinois, for an improvement in "Calling Devices for Automatic Telephone-Exchanges," errors appear in the printed specification requiring correction as follows: Page 1, line 91, for the word "reeciver" read *receiver;* page 5, line 97, after the word "lever" insert the reference-numeral *49;* page 6, line 82, claim 12, for the word "adaptaed" read *adapted;* same page, line 127, claim 17, for the word "lock" read *circuit-closer;* and that the said Letters Patent should be read with these corrections therein that the same may conform to the record of the case in the Patent Office.

Signed and sealed this 7th day of December, A. D., 1915.

[SEAL.] R. F. WHITEHEAD.

Cl. 179—90. *Acting Commissioner of Patents.*